United States Patent [19]

Chang

[11] Patent Number: 5,791,187
[45] Date of Patent: Aug. 11, 1998

[54] LEVEL MEASUREMENT METHOD USING MEASUREMENTS OF WATER COLUMN PRESSURE THEREFOR

[75] Inventor: Hak Soo Chang, Seoul, Rep. of Korea

[73] Assignee: Changmin Co., Ltd., Seoul, Rep. of Korea

[21] Appl. No.: 620,574

[22] Filed: Mar. 22, 1996

[30] Foreign Application Priority Data

Jul. 10, 1995 [KR] Rep. of Korea ............... 1995-20167
Nov. 1, 1995 [KR] Rep. of Korea ............... 1995-39230

[51] Int. Cl.$^6$ ............................................. G01F 23/00
[52] U.S. Cl. ........................... 73/299; 73/290; 73/300
[58] Field of Search ............... 73/299, 300, 301, 73/290 V, 32, 323, 700

[56] References Cited

U.S. PATENT DOCUMENTS

| | | | |
|---|---|---|---|
| 3,712,129 | 1/1973 | Rhoades | 73/700 |
| 4,393,705 | 7/1983 | Eidschun | 73/299 |
| 4,811,592 | 3/1989 | Miura et al. | 73/32 A |
| 4,834,104 | 5/1989 | Kreinick et al. | 73/32 R |
| 4,964,301 | 10/1990 | Lysen | 73/290 R |
| 4,987,776 | 1/1991 | Koon | 73/290 R |
| 5,249,463 | 10/1993 | Wilson et al. | 73/290 V |
| 5,253,512 | 10/1993 | Abramovich et al. | 73/290 V |

*Primary Examiner*—Richard Chilcot
*Assistant Examiner*—Jewel Aryis
*Attorney, Agent, or Firm*—Laurence R. Brown

[57] ABSTRACT

For the apparatus and method to measure the water depth and level using a gas bubble type level meter, the measurement pipe for water column pressure is composed of plastic pipes of inside diameter of 2-4 mm; two measurement pipes for water column pressure are bounded that the elevation difference between the ends of two measurement pipes for water column pressure is $\Delta h$; the upper ends of two measurement pipes for water column pressure are connected to the buffer tank using valves; the pressure sensor to measure the gas pressure in the buffer tank and the temperature sensor to measure the gas temperature in the buffer tank are installed; the supplying pipe of compressed gas with a valve is connected to the buffer tank; the outputs of pressure sensor and temperature sensor are sent to the apparatus to calculate the specific gravity, water depth and level; the level calculating apparatus contains an apparatus to convert displayed and calculated values of level to electrical or coded signals, and an apparatus to store the elevations of the upper and lower ends of the measurement pipes for water column pressure, elevation difference between the lower ends of the measurements pipes for water column pressure, elevation of reference point for level measurement, pressures and temperatures of compressed gas used at the reference state and the specific gravity of gas at the reference state; for case of automatic measurement, the valve controller is connected with valves which the valve connected to a long measurement pipe for water column pressure is opened, the valve to supply the compressed gas is opened, the valve connected to a long measurement pipe for water column pressure is closed and the valve connected to a short measurement pipe for water column pressure is opened;

Then, this is the measurement method to measure water depth and level with significantly decreased water depth measurement error through the compensation of air (gas) column pressure and specific gravity of water (liquid).

When measuring the water column pressure with submerged pressure sensors, the level is measured through the measurement of specific gravity of water by installing the two pressure sensors at the interval of $\Delta h$.

4 Claims, 8 Drawing Sheets

FIG.1
FIG 1A (PRIOR ART)   FIG 1B
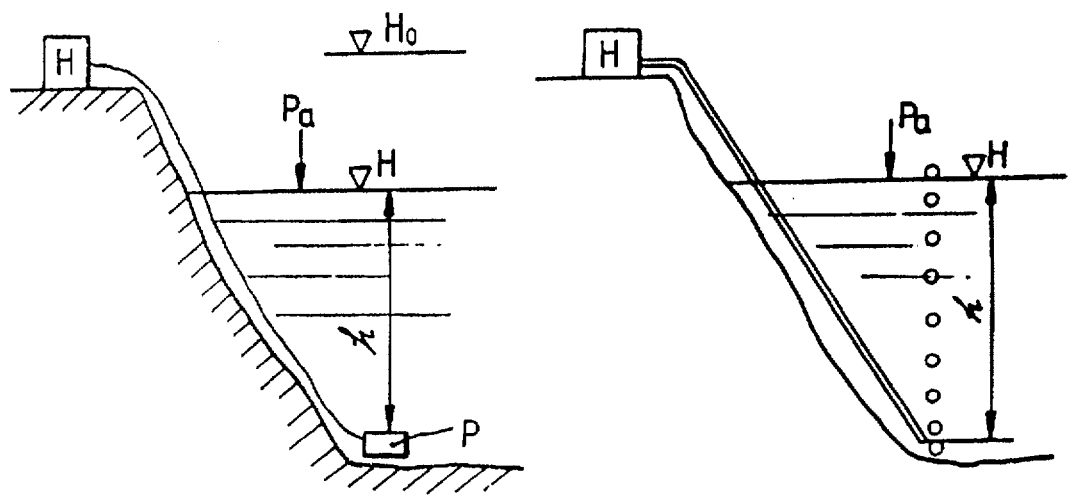
FIG.2
FIG 2A   FIG 2B
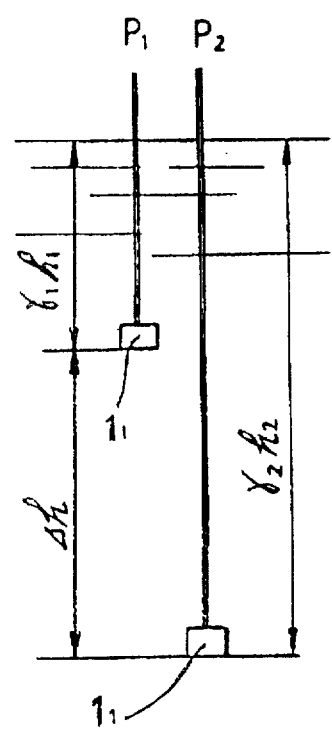
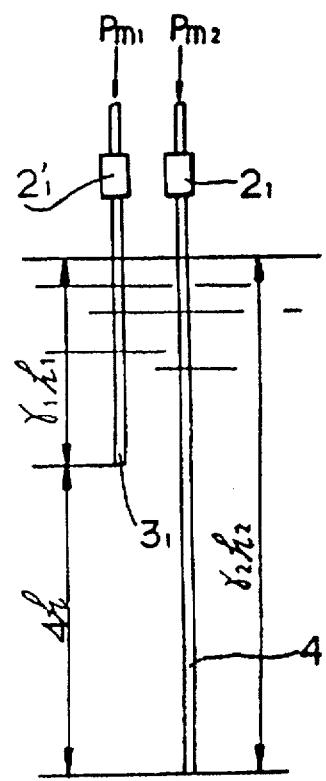

LEVEL MEASUREMENT METHOD USING MEASUREMENTS OF WATER COLUMN PRESSURE THEREFOR

BACKGROUND OF THE INVENTION

This invention is related with the measurement technology of level through the measurement of water column pressure, mainly applied to the level measurements of river, reservoir, underground water and tide. Furthermore, it can be applied to the level measurements of liquids other than water.

There are two kinds of methods known as a water column pressure level meter calculating level from the information of water depth by measuring the water column pressure.

A gas bubble type level meter is very initially realized, and a pressure sensor type level meter in which a pressure sensor is placed in water at a certain depth is practically utilized and widely used nowadays.

The biggest advantage of the water column pressure level meter is that the installation cost is much lower compared with that of the float type level meter. Since a float type level meter is operated only in a vertical direction, a vertical tower or a vertical well for level measurement should be constructed. (A vertical tower or a vertical well for level measurement plays a role to reduce the wave oscillation.)

However, water column pressure level meter does not need such structures shown in FIG. 1 (a) and (b), and needs much less installation cost.

For a pressure senor type level meter, a cable which is used as a power cable for the pressure sensor, P, which is placed in water at a certain depth and a data transmission cable is wired along the skirt of the river and reservoir, and a thin pipe compensating the atmospheric pressure, $P_a$, is installed within the cable.

For a gas bubble type level meter, a measurement pipe for water column pressure is installed at a certain depth along the skirt.

The water depth h is obtained through the measurement of water column pressure, γh, (γ—specific gravity of water) using a pressure sensor or for a gas bubble type, through the measurement of pressure required to remove out the water in a measurement pipe for water column pressure, and then the level, H, is measured using the following equation, $$H = H_0 - h \quad (1)$$

where $H_0$ is an elevation at the reference point. Therefore, since the only parameter to be measured is the water depth, h, the measurement of water depth, h, will only be mentioned from now.

Besides the advantage that the installation cost is low, a float type level meter can not be operated when the water of river and reservoir is frozen in winter, however, a water column pressure level meter has an advantage that water level under the ice layer can be measured. In spite of this big advantage, a water column pressure level meter is not widely used for hydrological observations. The main reasons are as follows.

1). The error of water depth measurement is large.

The main reason for a large measurement error is given below.

The pressure applied to the pressure sensor when using a submerged pressure sensor is given as follows.

$$P = \gamma h + P_a \quad (2)$$

Then the water depth, h, is as follows, $$h = \frac{P - P_a}{\gamma} \quad (3)$$

where γ—specific gravity of water at a range of water depth, h, and $P_a$—atmospheric pressure at the water surface which is a function of air composition, weather and wind velocity.

The specific gravity of water depends on water temperature, and especially changes with concentration of floating materials. The water temperature of river and reservoir is changing with the water depth and varies from 4°–25° C. The specific gravity of pure water at the above temperature range changes from 1.0–0.990707 g/cm³. If the water depth is measured using eq. (3) and γ=1.0, the water depth measurement error due to specific gravity reaches 0.93%. It is not common that the average water temperature is 25° C. at the range of water depth h, however, it is common that the average water temperature is 18° C. The specific gravity of water at 18° C. is 0.99862, and the water depth measurement error reaches 0.14% when using eq. (3) and γ=0.99862. If h is 10 m, the absolute measurement error of water depth is 1.4 cm.

Besides the effect of water temperature variation, the effect of concentration of floating materials on the water depth measurement is large. Depending on the district, it is common that the concentration of floating materials is 5 g/l, that is, 5×10⁻³ g/cm3. The water depth measurement error is additionally increased by 0.5% according to the specific gravity variation of water due to concentration change. Considering these effects, the water depth measurement error exceeds 5 cm for the above example.

Besides these errors, the error of the atmospheric pressure compensation is not small. In order to compensate the atmospheric pressure, $P_a$, a thin pipe which transfers atmospheric pressure to the pressure sensor is installed within a cable connected to the pressure sensor, the atmospheric pressure variations at the water surface and the ground are not the same. There occurs non-negligible difference between atmospheric pressures at the water surface and the bottom end of atmospheric pressure compensation tube.

Furthermore, there is an error from pressure sensor. The total measurement error of water depth is given as follows, $$\delta_h = (\delta^2/P + \delta^2/\gamma + \delta^2/Pa)^{1/2} \quad (4)$$

where $\delta_P$—error of pressure sensor (0.05–0.1%), $\delta_\gamma$—measurement error of average specific gravity of water, $\delta_{P_a}$—error of atmospheric pressure compensation. The absolute error of water depth measurement usually exceeds ±10 cm.

When water depth is measured using a gas bubble type level meter, the pressure of gas required to completely remove out the water in the measurement pipe for water column pressure is measured, and if this pressure is expressed as $P_m$, the relationship with the water column pressure is given as follows.

$$\gamma h = P_m + \Delta P_m \quad (5)$$

$\Delta P_m$ will be explained in detail later. $\Delta P_m$ is the air column pressure at a height, $h_0$ shown in FIG. 1 (b). $\Delta P_m$ depends on the air temperature and $P_m$.

The measurement error of water depth becomes large when the air column pressure is neglected since the specific gravity of air at 1 atmospheric pressure and 20° C. is about 1.2×10⁻⁶ kgf/cm³.

Another error can be generated when the specific gravity of water is not exactly known. If $\Delta P_m$ is neglected, the measurement error of a gas bubble type level meter is even increased compared with that of a pressure sensor type level meter.

2). Inconvenience of operation and maintenance

When a pressure sensor is installed in water, layers of microscopic underwater organisms and fine particles are formed on the pressure sensor as time goes by. Therefore, the pressure sensor should be cleaned periodically. Furthermore, the pressure sensor used should be periodically calibrated in order to maintain a higher accuracy.

As described above, when it is used for a permanent level observatory, it is inconvenient to operate and maintain, and the operation and maintenance cost is more expensive than that of a float type level meter.

It is very common that the level is measured manually by an observer who patrols level measurement observatories of underground water, since the level measurement interval is long, for example one per 10 days. In this case, when the distance from the ground to the water surface is several tenth meters or exceeds 100 m, it is very hard to carry cable of over 100 m with a pressure sensor, and very complicated and takes long time to install the pressure sensor at a constant elevation. It is just convenient to use for an automatic level recording, for example, the detailed research of level variation. As described above, it is not widely used due to its complicity of operation and maintenance.

For a gas bubble type level meter, since all of the components including the pressure sensor are located on the ground, operation and maintenance are simple, and the measurement pipe for water column pressure will not be plugged by microscopic organisms and fine particles under the condition that it is used at least one or two times a day. Furthermore, it is more convenient and needs less installation cost than that of a pressure sensor type level meter.

One of the disadvantages is that it needs compressed gas or air in case of automatic recording or remote measurement. When power is available, a small air compressor can be used, however, when power is not available, a tank of compressed gas is required. Therefore, it is inconvenient that the tank should be replaced or recharged periodically, however, since the gas consumption rate can be reduced to a small amount, it is guaranteed that the changing interval will be over 1 year.

When measuring the level using portable level meter by patrolling the measurement observatories, an observer carries a portable level meter and a manual air pump. A plastic measurement pipe of 2–4 mm ID to measure water column pressure should be permanently installed.

If the measurement error can be decreased significantly, a gas bubble type level meter is more convenient among the water column pressure level meters.

SUMMARY OF THE INVENTION

The objective of this invention is to provide a better water column pressure level meter compensating the common defect of water column pressure level meter which the level measurement error according to the variations of specific gravity of water and water depth according to air column pressure at the range of water depth to be measured is large.

The another objective of this invention is to provide a better water column pressure level meter compensating the defect not to guarantee the certain allowable measurement accuracy at the full measurement range due to the error of pressure sensor.

The another objective of this invention is to provide a better gas bubble type level meter which is more precise and consumes less gas.

BRIEF DESCRIPTION OF THE DRAWINGS

This invention will now be described in detail with reference to the attached drawings, in which;

FIG. 1 is a view illustrating the principles and installations of a submerged pressure sensor type level meter and a gas bubble type level meter;

FIG. 2 is a view illustrating the method to measure the specific gravity of water or liquids other than water at the water depth measurement range according to this invention;

Figure 3:
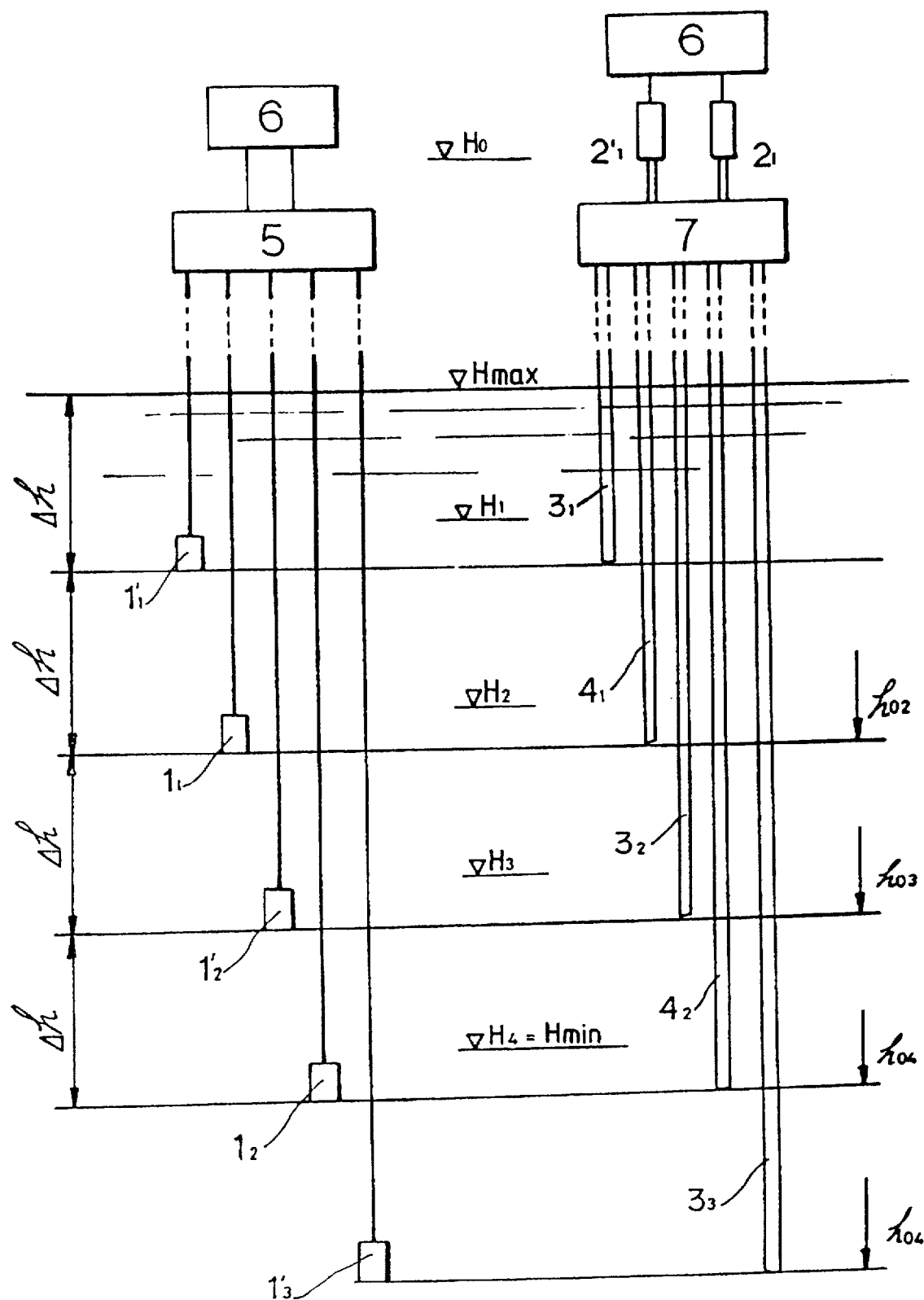
FIG. 3 is a view illustrating the method to measure the water depth/level with a given allowed error at a full water depth measurement range when the measurement range of level variation is large according to this invention.

\* \* \* Explanation of symbols for the main components of the drawings \* \* \*

$1'_1, 1_1$ : pressure sensor
$2'_1, 2_1$ : gas pressure sensor
2 : pressure sensor
$3_1, 4_1$ measurement pipe for water column pressure
5 : transmitter
6 : level calculating apparatus (level meter)
7 : valve controller
8 : buffer tank
9 : valve
10 : condensed water drain valve
11 : temperature sensor
12 : pressure safety valve
13 : air compressor or tank for compressed gas
14 : protection pipe
15 : pipe
16 : weight
17 : wire
18 : pipe well
19 : anchor shaped weight
20 : ship

Description of the Preferred Embodiments

This invention is described in detail using attached drawings as follows.

FIG. 2 (a) and (b) shows the method to measure the specific gravity of water which is the first objective of this invention. FIG. 2 (a) shows the case using a submerged pressure sensor, and FIG. 2 (b) shows the case to measure the water column pressure using a gas bubble type level meter.

The pressure sensors, $1'_1$ and $1_1$, are installed at the water depths, $h_1$ and $h_2$, as shown in FIG. 2 (a), respectively. The elevation difference, $\Delta h = h_2 - h_1$, is constant, and measured earlier precisely. The pressure, $P_2$, corresponding to water column pressure, $\gamma_2 h_2$, is measured using the submerged pressure sensor, $1_1$, and the pressure, $P_1$, corresponding to water column pressure, $\gamma_1 h_1$, is measured using the pressure sensor, $1'_1$.

There is a difference between the average specific gravity of water at an $h_1$ range, $\gamma_1$ and the average specific gravity of water at an $h_2$ range, $\gamma_2$, and $\gamma_1$ can be expressed using $\gamma_2$ as follows, $$\gamma_1 = \gamma_2 \left( 1 + \frac{\gamma_1 - \gamma_2}{\gamma_2} \right) = \gamma_2(1 + \delta_{\gamma 12})$$

or $\gamma_2$ can be expressed using $\gamma_1$ as follows.

$$\gamma_2 = \gamma_1 \left( 1 + \frac{\gamma_2 - \gamma_1}{\gamma_1} \right) = \gamma_1(1 + \delta_{\gamma 21})$$

The difference between $P_2$ and $P_1$ is given as follows.

$$\Delta P_{21} = P_2 - P_1 = \gamma_2 h_2 - \gamma_2(1+\delta_{\gamma 12})h_1 = \gamma_2(\Delta h - \delta_{\gamma 12} h_1)$$

Then $\gamma_2$ is given as follows.

$$\gamma_2 = \frac{\Delta P_{21}}{\Delta h \left( 1 - \delta_{\gamma 12} \frac{h_1}{\Delta h} \right)} \quad (6)$$

Hence $\gamma_1$ can be found using the same procedure as follows.

$$\gamma_1 = \frac{\Delta P_{21}}{\Delta h \left( 1 + \delta_{\gamma 21} \frac{h_2}{\Delta h} \right)} \quad (7)$$

However, the actual equation for specific gravity when $\delta_{\gamma 12}$, $\delta_{\gamma 21}$, $h_1$, and $h_2$ are unknown is given as follows.

$$\gamma_2 = \frac{\Delta P_{21}}{\Delta h} \quad (8)$$

or $$\gamma_1 = \frac{\Delta P_{21}}{\Delta h} \quad (9)$$

Therefore, specific gravity of water $\gamma'_2$ or $\gamma'_1$ can be measured with a constant error.

Equations (8) and (9) are used to measure the water column pressure $P_i = \gamma h_i$ using a submerged pressure sensor, and for the case that water column pressure is measured using a pressure sensor connected with atmospheric pressure compensation tube in order to compensate the atmospheric pressure, another equation to be mentioned later should be used.

For the case of a gas bubble type level meter, two measurement pipes for water column pressure, $3_1$ and $4_1$, are installed with an elevation difference, $\Delta h$, as shown in FIG. 2 (b). Then specific gravity of water, $\gamma'_2$, at an $h_2$ range is measured by measuring the pressures, $P_{m1}$ and $P_{m2}$, using pressure sensors, $2'_1$ and $2_1$, required to remove water in the pipes, $3_1$ and $4_1$. The equation to measure the specific gravity of water using a gas bubble type level meter is different from eq. (8) and will be shown later.

From now, water depth, $h_2$, will be measured using $\gamma'_2$. The error of measured specific gravity, $\gamma'_2$, according to eq. (8) is given as follows when the measurement errors, $\Delta P_{21}$ and $\Delta h$, are not considered.

$$\delta_{\gamma 2} = \frac{\gamma'_2 - \gamma_2}{\gamma_2} = -\delta_{\gamma 12} \cdot \frac{h_1}{\Delta h} \quad (10)$$

The error of specific gravity of water is shown in Table 1. The measurement error, $\gamma'_2$, as a function of $h_1/\Delta h$ is listed when the temperature of water surface to is 24° C., and water temperatures at $h_2 = 10$ m are 18° C. and 15° C., respectively, that is, $\Delta t = 6°$ C. and 9° C., respectively. And it is assumed that the water temperature is changing linearly as a function of water depth. Since measurement error, $\gamma'_2$, is decreased as the concentration of floating materials is increased, the errors listed in Table 1 are the worst cases. In winter, especially when water is frozen, the temperature difference according to the water depth under the ice becomes much less than 6°–9° C. Therefore, the measurement errors listed in Table 1 are the maximum expected values.

TABLE 1

| | | Measurement error of specific gravity of water | | | | | | | |
|---|---|---|---|---|---|---|---|---|---|
| $\Delta t$ | $h_1/\Delta h$ | 9.9/0.1 = 99 | 9/1 = 9 | 8/2 = 4 | 7/3 = 2.3 | 6/4 = 1.5 | 5/5 = 1 | 4/6 = 0.67 | 2/8 = 0.25 |
| 6 °C. | $\delta_{\gamma 2}\%$ | 0.066 | 0.06 | 0.053 | 0.051 | 0.04 | 0.034 | 0.02 | 0.019 |
| 9 °C. | $\delta_{\gamma 2}\%$ | 0.088 | 0.08 | 0.074 | 0.065 | 0.057 | 0.048 | 0.029 | 0.02 |

As shown in Table 1, the measurement error of specific gravity is decreased as the ratio, $h_1/\Delta h$, is decreased.

Actually, $h_1/\Delta h$ can not be taken as small values. For example, if the level is lowered down by about 2 m when $h_1$ is 2 m and $\Delta h$ is 8 m, the measurement pipe for water column pressure, $3_1$, can not be operated. Therefore, if $h_1/\Delta h$ is about 2, the error of $\Delta_2$, $\delta_{\gamma 2}$, can be guaranteed below 0.05%. If $h_1$ is decreased as the level is lowered down ($\Delta h$=const), the measurement error of specific gravity becomes even smaller. For example, if $h_1 = 7$ m, $h_2 = 10$ m, and $\Delta h = 3$ m, respectively, then $\delta_{\gamma 2} = 0.051\%$, if $h_1 = 2$ m, $h_2 = 5$ m when level is lowered down by 5 m, then $h_1/\Delta H \approx 0.67$, and $\delta_{\gamma 2} = 0.03\%$, respectively. The error analyzed above is the measurement error of average specific gravity of water, and the measurement errors of pressure difference, $\Delta P_{21}$ and $\Delta h$, are added to the actual measurement error.

The total measurement error can be expressed as follows.

$$\Sigma \delta_{\gamma 2} = (\delta^2_{\gamma 2} + \delta^2_{\Delta P} + \delta^2_{\Delta h})^{1/2}$$

Since $\Delta h=3-5m$ can be easily measured with an error of $\pm 1$ mm, the $\delta_{66\,h}$ of 0.02–0.03% can be guaranteed. Therefore, it is important to reduce the measurement error of $\Delta P_{21}$, $\delta_{\Delta P}$. For a pressure sensor type level meter, the characteristics of two pressure sensors should be perfectly same in order to significantly decrease $\delta_{\Delta P}$ under the condition that two pressure sensors $1_1$ and $1'1$ are used. Under this condition, errors of pressure sensors themselves are cancelled out each other through the calculation of $\Delta P_{21}=P_2-P_1$. For the case of a gas bubble type level meter, $\Delta P_{m21}$ can be directly measured using a differential pressure gage. Since the measurement range of differential pressure is $\gamma \times \Delta h$, the measurement error of differential pressure can be guaranteed under $\delta_{\Delta P} \simeq 0.05\%$ through the test and calibration at a narrow measurement range. In this case, $\Sigma \delta_{\gamma 2} < 0.07\%$ is guaranteed. If $\Delta P_{m21}$ is calculated when only one pressure sensor is used, the pressure $P_{m2}$ is measured at the measurement pipe for water column pressure, $4_1$, and $P_{m1}$ is measured using the measurement pipe for water column pressure, $3_1$, then the error of $\Delta P_{m21}$ is even more decreased.

The measurement error of $h_2$ can be significantly reduced through the measurement of specific gravity of water at $h_2$ range with a comparatively high accuracy using two submerged pressure sensors or two measurement pipes of a gas bubble type water column pressure installed at a constant elevation difference. In this case, it is reasonable to select $h_1/\Delta h \leq 2.0$.

The equation for water depth, $h_2$, is given as follows by substitution of measured specific gravity of water, $\gamma_2$, into eqs. (3) and (5).

$$h_2 = \frac{P_2 - P_a}{P_2 - P_1} \times \Delta h \quad (11)$$

Water(liquid) depth measurement equation for the case that the atmospheric pressure compensation tube is used to compensate the atmospheric pressure $P_a$ exerted on the water(liquid) surface is not the same as equation (11). The detail of this will be mentioned later.

When the level is measured by gas bubble type, $$h_2 \simeq \frac{P_{m2} + \Delta P_{m21}}{P_{m2} - P_{m1}} \times \Delta h \quad (12)$$

(The exact equation will be shown later.)
Even though the specific gravity of water is measured with the highest accuracy, the measurement error of water depth depends on $P_2$ or error of pressure sensor, $\delta P$, measuring $P_{m2}$. Even though the pressure sensor is compensated using a temperature coefficient under the condition that the level meter is operated under the field condition (ambient temperature is changing from $-20°$ to $40°$ C.), it is difficult to guarantee the error of pressure sensor under 0.05–0.1%. As the water depth to measured is increased, the absolute error of water depth measurement, $\Delta_h$, due to the error of pressure sensor, $\delta_P$, is increased, and if the error of pressure sensor, $\delta_P$, the total measurement error of specific gravity of water, $\Sigma\delta_{\gamma 2}$ (eq. (4)), and the allowable error, $\Delta 0$, are known, then the maximum limit of water depth measurement, $h_{max}$, for the water column pressure level meter can be found using the following equation, $$h_{max} = \frac{\Delta h^0}{\delta_h} \quad (13)$$

where $\delta_h = (\delta 2/P + \Sigma \delta^2_{\gamma 2})^{1/2}$.

If allowable error $\Delta 0/h = \pm 1$ cm and $\delta_h = 0.1\% = 0.001$, then $h_{max}$ will be 1000 cm=10 m.

According to this invention, when the measurement range, $\Delta H = H_{max} - H_{min}$, is several times larger than $h_{max}$, the water depth is measured by installing several submerged pressure sensors or measurement pipes for water column pressure at the constant elevation difference, $\Delta h$. If the elevation difference, $\Delta h$, is selected as $\Delta h \simeq h_{max}/2$, the number of pressure sensors or measurement pipes for water column pressure, n, is given as follows.

$$n = \frac{\Delta H}{\Delta h} + 1 \quad (14)$$

If $\Delta h = h_{max}/2 = \Delta 0/h/2$ $\delta_h$ is substituted in eq. (14), the following equation is obtained.

$$n = \frac{2\delta_h}{\Delta_h^0} \Delta H + 1 \quad (15)$$

In this case, if the level is $H_{max}$ the water depth and the specific gravity of water are measured using the first and the second pressure sensors or measurement pipes for water column pressure, and if the level becomes $H_2 = H_{max} - \Delta h + \Delta$, then the water depth and the specific gravity of water are measured using the second and the third pressure sensors or measurement pipes for water column pressure. $\Delta$ is the water depth corresponding to the minimum allowable pressure of pressure sensors.

If the minimum allowable pressure of pressure sensors, $P_{min}$, is 0.01 atmospheric pressure guaranteeing given measuring characteristics by pressure sensors, $\Delta$ becomes about 10 cm. If the above method is used for the case that the level change is large, e.g., for the artificial lake or reservoir, the level can be measured within an allowable absolute error( $\Delta 0/h \leq \pm 1$ cm). There will be no problem, if $\Delta h < h_{max}/2$ is selected.

FIG. 3 shows a case of n=5. In FIG. 3, (6) is a level meter calculating water depth, h, and level, H, and (5) is a transmitter inputting converted output signals from pressure sensors to (6). (7) is a valve controller to operate valves connecting the measurement pipes for water column pressure to the pressure sensors, $2_1$ and $2_2$. A pipe to supply compressed gas is not shown in FIG. 3 (b). The elevations of the submerged pressure sensors, $1_1$, $1_2$, $1_2$ and $1'_3$, and elevations of measurement pipes for water column pressure, $4_1$, $3_2$, $4_2$ and $3_3$ premeasured as $h_{o2}$, $h_{o3}$, $h_{o3}$ and $h_{o5}$, respectively, are inputted to the level meter (6) with the value of reference elevation, $H_0$.

The level, $H_i$ is calculated as follows.

$$H_i = H_0 - h_{oi} + h_y \quad (16)$$

If the reference elevation, $H_0$, is the same as $h_{oi}$, the level is given as follows.

$$H = h_{oi} - h_y$$

As shown in FIG. 3, if submerged pressure sensors are used, the number of pressure sensors is increased. Therefore, it is a big disadvantage that operation and maintenance of the pressure sensors are much complicated, and calibration and test of pressure sensors are much increased.

If water depth and water column pressure are measured using a gas bubble type level meter, since several plastic pipes of small inside diameter (ID : 2–4 mm) in a bundle shape are installed, it is much convenient that it needs simple installation and less maintenance. However, it has a disadvantage that the valve controller (7) is little more complicated than the electronic transmitter (5).

According to this invention, a given allowable absolute error is guaranteed regardless of level measurement range when measuring the level through the measurement of water column pressure as mentioned above.

Another objective of this invention is to enhance the accuracy of water depth measurement using a gas bubble type level meter, and detailed description is given below.

Figure 4:
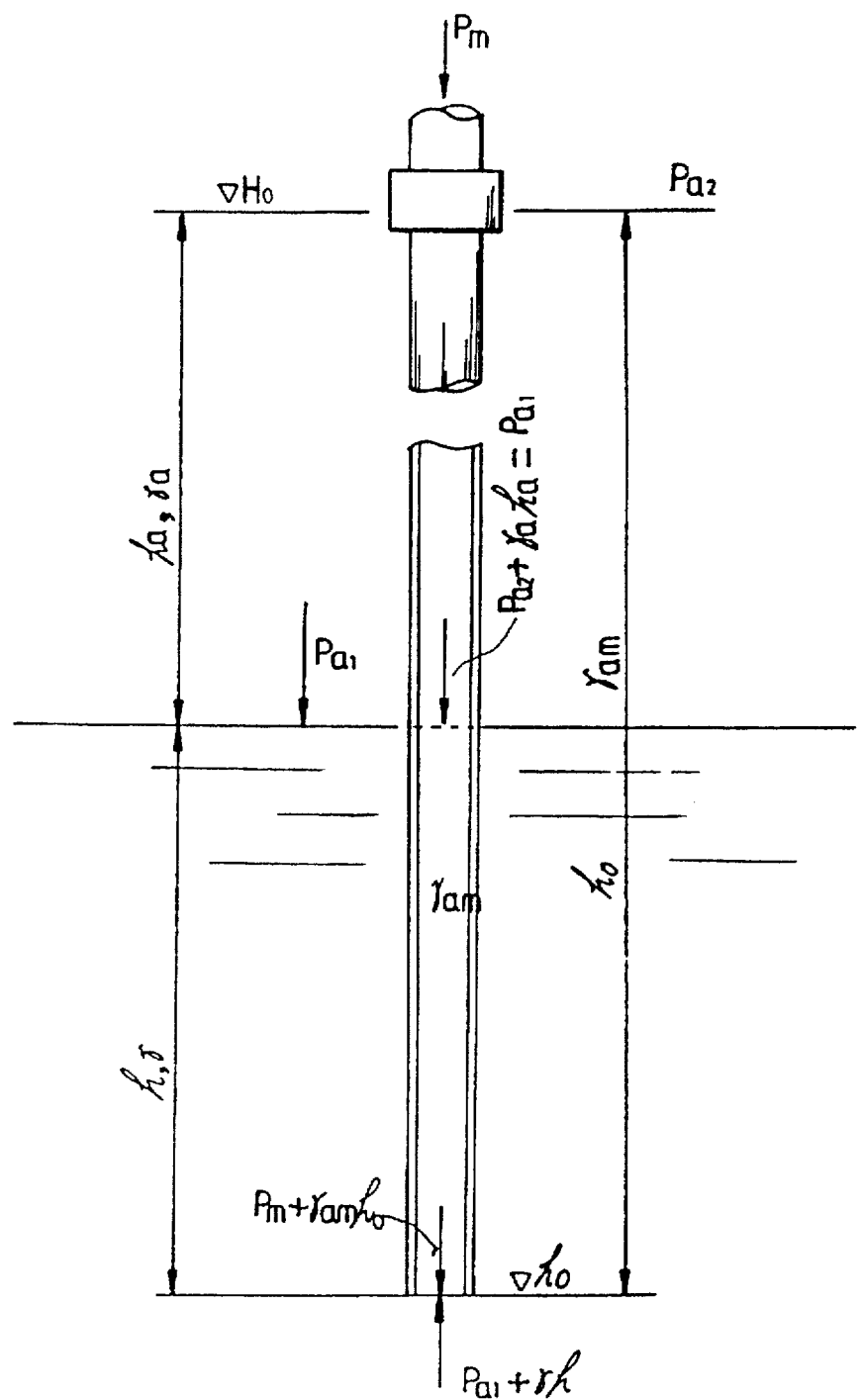
FIG. 4 is a view showing the pressure distribution of the gas bubble type water depth/level measurement method.

The pressure relationship is shown in FIG. 4 when the gas pressure in the measurement pipe for water column pressure and water column pressure is the same.

Water is filled in the measurement pipe for water column pressure (4) until the excessive pressure, $P_m$, is applied to the measurement pipe for water column pressure (4), and if capillary attraction is neglected, the level of the water surface is the same as the ambient level, H. The pressure of $P_{a1}=P_{a2}+\gamma_a h_a$ is exerted on the water surface of the measurement pipe for water column pressure (4), where $P_{a1}$ and $P_{a2}$ are atmospheric pressures at the location H and $H_0$ at which the pressure sensor (2) is installed, $h_a$ is the height of air column from H to $H_0$, and $\gamma_a$ is the specific gravity of air at $h_a$.

The pressure at the end of the measurement pipe for water column pressure (4) is $P_{a1}+\gamma h$. If water in the measurement pipe for water column pressure is completely removed out by applying the excessive pressure, $P_m$, to the measurement pipe for water column pressure (4), the pressure sensor (2) measures $P_m$ only.

The relationship between pressures are as follows.

$$P_{a1}+\gamma h = (P_{a1}-\gamma_a h_a)+P_m+\gamma_{am} h_0$$

where $\gamma_{am}$ is the specific gravity of gas at the range of $h_0=h+h_a$ when the excessive pressure, $P_m$, is applied.

Therefore, water depth, h, is given as follows.

$$h = \frac{P_m + \gamma_{am} h_0 - \gamma_a h_a}{\gamma} \tag{17}$$

$\Delta P_m$ is $\gamma_{am} h_0 - \gamma_a h_a$ which was mentioned in eq. (5).

In order to measure the water column pressure, another gas, e.g., nitrogen other than compressed air can be used. $\gamma_{am}$ and $\gamma_a$ at the reference state ($P_0$=1.03 kgf/cm², $T_0$=293K) as functions of the specific gravities of gas and air, $\gamma_{g0}$ and $\gamma_{a0}$, can be expressed as follows.

$$\gamma_{am} = \gamma_{g0}\frac{T_0}{T}\left(1+\frac{P_m}{P_0}\right) =$$

$$\alpha\gamma_{a0}\frac{T_0}{T}\left(1+\frac{P_m}{P_0}\right); \alpha = \frac{\gamma_{g0}}{\gamma_{a0}}$$

$$\gamma_a = \gamma_{a0}\frac{T_0}{T} \quad (P_0 = 1.03 \text{ kgf/cm}^2 \simeq P_a)$$

The water depth, h, can be found by substituting the above equations into eq. (17) as follows.

$$h = \frac{P_m + \gamma_{a0}\frac{T_0}{T} h_{o2}\left[\alpha\left(1+\frac{P_m}{P_0}\right)-1\right]}{\gamma - \gamma_{a0}\frac{T_0}{T}} \tag{18}$$

If water column pressure is measured using compressed air, and $\gamma_{g0}=\gamma_{a0}$, h is given as follows.

$$h = \frac{P_m\left(1+\gamma_{a0}\frac{T_0}{TP_0} h_0\right)}{\gamma - \gamma_{a0}\frac{T_0}{T}} \tag{19}$$

It is convenient to use the following equations instead of eq. (18) and (19).

$$h \simeq \frac{P_m\left[1+\gamma'_{a0}\frac{T_0}{T}(h_0+10^3)\right]+(\alpha-1)\gamma\gamma_{a0}\frac{T_0}{T} h_0}{\gamma} \tag{20}$$

And when $\gamma_{g0}=\gamma_{a0}$, that is, $\alpha=1$, eq. (20) becomes as follows.

$$h \simeq \frac{P_m\left[1+\gamma'_{a0}\frac{T_0}{T}(h_0+10^3)\right]}{\gamma} \tag{21}$$

where $$\gamma'_{a0} = \gamma_{a0}/P_0\left(\frac{1}{\text{cm}}\right),$$

$10^3 \simeq P_0/10^{-3}$(cm). $\gamma_{g0}$—specific gravity of gas used to measure the water column pressure at the reference state, $\gamma_{a0}$—specific gravity of air at the reference state. (The differences between eqs. (18), (19) and (20), (21) are negligibly small. The differences between above equations are not over 0.2 mm if $h_0$ is 100 m, the specific gravity of water varies from 0.0998 to $1.01\times10^{-3}$ kgf/cm³, and the air temperature varies from 263K to 303K.)

There will be large errors if water depth is calculated simply by h'=$P_m/\gamma$, not by eq. (19) or (21).

Table 2 shows the measurement errors of water depth, $\Delta_h$=h–h', if specific gravity of water, $\gamma$, is $10^{-3}$ kgf/cm³, specific gravity of air at the reference state, $Y_{a0}$, is 1.2×10⁻⁶ kgf/cm³ $P_{m=}$1 kgf/cm² (h≃10 m).

It is impossible to measure the actual average temperature of gas in the measurement pipe for water column pressure. In Table 2, the average temperature of gas at $h_0$=100 m is 20° C., and if measured temperature is 25° C. at the worst case, the error becomes (13.2–12.8)2=0.2 cm. Therefore, there is almost no effect due to the measurement error of gas temperature. Under this condition, there will be no problem that the temperature of gas is measured at any point, for example, at a buffer tank.

TABLE 2

$$\Delta_h = \left(h-\frac{P_m}{\gamma}\right) \text{(cm)}$$

| | t(°C.) | | | | | | |
|---|---|---|---|---|---|---|---|
| h₀(m) | −20 | −10 | 0 | 10 | 20 | 30 | 40 |
| 20 | 4.2 | 4.0 | 3.9 | 3.7 | 3.6 | 3.5 | 3.3 |
| 40 | 7.0 | 6.7 | 6.4 | 6.2 | 6.0 | 5.8 | 5.6 |
| 60 | 9.7 | 9.4 | 9.0 | 8.7 | 8.4 | 8.1 | 7.9 |
| 80 | 12.5 | 12.0 | 11.6 | 11.2 | 10.8 | 10.5 | 10.1 |
| 100 | 15.3 | 14.7 | 14.2 | 13.7 | 13.2 | 12.8 | 12.4 |

In the method to measure the specific gravity of liquid (water) using a gas bubble type described before, the equation to calculate the specific gravity of liquid (water) using $P_{m1}$ and $P_{m2}$ measured at the measurement pipes for water column pressure which is installed at the elevation difference, $h_{02}-h_{01}=\Delta h$, is derived by substituting $P_{m2}$, $h_{02}$, $P_{m1}$, $h_{01}$ into eq. (17).

$$\gamma = \frac{(P_{m2}-P_{m1})\left(1+A\frac{h_{02}}{P_0}\right)+A\left(1+\frac{P_{m1}}{P_0}\right)\Delta h}{\Delta h} \tag{22}$$

-continued where $A = \alpha\gamma_{\alpha 0}\dfrac{T_0}{T}$, $\alpha = \gamma_{g0}/\gamma_{\alpha 0}$.

It is convenient to use eq. (23) instead of eq. (22).

$$\gamma = \dfrac{(P_{m2} - P_{m1})\left(1 + \alpha\gamma_{\alpha 0}\dfrac{T_0}{T}\dfrac{h_{02}}{P_0}\right)}{\Delta h\left[1 - \alpha\gamma_{\alpha 0}\dfrac{T_0}{T}(1 + P'_{m1}) \times 10^3\right]} \quad (23)$$

Equation to calculate the specific gravity of water at $T_0=293K$, $P_0=1.03$ kgf/cm$^2$, $\gamma_{\alpha 0}=1.2\times 10^{-6}$ kgf/cm$^3$ is given as follows.

$$\gamma = \dfrac{(P_{m2} - P_{m1})\left(1 + 3.42\times 10^{-4}\alpha\dfrac{h_{02}}{T}\right)}{\Delta h\left[1 - \dfrac{0.342\alpha}{T}(1 + P'_{m1})\right]} \quad (24)$$

where $P'_{m1}=P_{m1}/P_0$ is a dimensionless value. Directly measured parameters are $P_{m2}$, $P_{m1}$ and gas temperature, T, and $\alpha$, $h_{02}$ and $\Delta h$ are constant.

The specific gravity of liquids other than water can be measured using this method.

The following equation can be obtained by substituting eq. (24) into eq. (20).

$$h_2 = \left\{\dfrac{P_{m2}\left(1 + 3.42\times 10^{-4}\dfrac{h_{02}+10^3}{T}\right) + }{(P_{m2}-P_{m1})\left(1 + 3.42\times 10^{-4}\alpha\dfrac{h_{02}}{T}\right)}\right\} \times \\ \Delta h\left[1 - \dfrac{0.342\alpha}{T}(1 + P'_{m1})\right] \quad (25)$$

Water depth is expressed as followings, since $\alpha=1$ when using compressed air, $$h_2 = \left\{\dfrac{P_{m2}\left(1 + 3.42\times 10^{-4}\dfrac{h_{02}+10^3}{T}\right)}{(P_{m2}-P_{m1})\left(1 + 3.42\times 10^{-4}\alpha\dfrac{h_{02}}{T}\right)}\right\} \times \\ \Delta h\left[1 - \dfrac{0.342\alpha}{T}(1 + P'_{m1})\right] \quad (26)$$

where $10^3 = \dfrac{1(\text{kgf/cm}^2)}{\gamma} = \dfrac{1(\text{kgf/cm}^2)}{10^{-3}(\text{kgf/cm}^3)}$ (cm).

The specific gravity of water at river and reservoir varies very slowly. Especially, the specific gravity of deep underground water varies a little bit. Under these conditions, it is not needed to measure the specific gravity of water at each time of measurement, if the level is measured frequently for example one time an hour. It is reasonable to measure the specific gravity one or two times a day, or one time per ten days for the underground water using eq. (24), and substitute this value into eqs. (20) and (21).

Especially, when the level of tide is continuously measured or level of river is continuously measured in case of flooding, it is sufficient to measure the specific gravity of water one time a day.

Sometimes the elevation of water surface of the artificial reservoir is located higher by several tenth meters than that of level measurement observatories. For this case, the following equation should be used to measure the water depth.

$$h = \dfrac{P_m + \gamma_{\alpha 0}\dfrac{T_0}{T}|\alpha(1+P'_m)h_0 + h_{\alpha 1} - P'_m\times 10^3|}{\gamma} \quad (27)$$

The following equation should be used to measure the specific gravity of water using two measurement pipes for water column pressure installed at an elevation difference $\Delta h$.

$$\gamma = \dfrac{(P_{m2}-P_{m1})\left[1 + \alpha\gamma_{\alpha 0}\dfrac{T_0}{T}(h_{02} + 10^3/\alpha)\right]}{\Delta h\left[1 - \alpha\gamma_{\alpha 0}\dfrac{T_0}{T}(1 + P'_{m1})\times 10^3\right]} \quad (28)$$

where $P_{m1}=P_{m1}/P_0$ is a dimensionless value.

The depth of liquid of tank can be measured using eqs. (27) and (28) when the tank is located higher than the level measurement point with $P_0/\gamma$ value instead of $10^3$, where $\gamma$ is the specific gravity of liquid.

According to this invention, specific gravity of water (liquid) and water depth can be precisely measured using gas bubble type. It is frequently needed to measure not only the water depth but also the specific gravity of water(liquid). For example, when measuring the tide level, the salinity(content of salt) variations of sea water can be measured by measuring the specific gravity of sea water.

Furthermore, measurement of specific gravity variations are very important for the hydrological observations.

If it is not needed to measure the specific gravity of water(liquid), and is needed to measure the water depth and level, the following simpler water depth measurement equations are used instead of equations (25) and (26).

$$h_2 = \dfrac{\Delta h}{1 - \dfrac{P_{m1}}{P_{m2}}\left(1 \mp \gamma_{\alpha 0}\dfrac{T_0}{T}\Delta h\right)} \quad (29)$$

or $$h_1 = \dfrac{\Delta h}{\dfrac{P_{m2}}{P_{m1}}\left(1 \pm \gamma_{\alpha 0}\dfrac{T_0}{T}\Delta h\right) - 1} \quad (30)$$

The signs (−) and (+) in the equations (29) and (30) are for the case that the level(water depth) measurement observatory is located above the water surface, and the signs (+) and (−) in the equations (29) and (30) are for the case that the level(water depth) measurement observatory is located lower than the water surface.

The above equations are obtained from equation (25), that is, derived from the following relationship by setting the specific gravities of water in the ranges of $h_1$ and $h_2$ are the same.

$$\dfrac{\gamma h_2}{\gamma h_1} = \dfrac{h_2}{h_2 - \Delta h} = \dfrac{1}{1 - \dfrac{\Delta h}{h_2}} =$$

$$\dfrac{P_{m2}\left[1 + \gamma_{\alpha 0}\dfrac{T_0}{T}(h_{02}+10^3)\right]}{P_{m1}\left[1 + \gamma_{\alpha 0}\dfrac{T_0}{T}(h_{02}+10^3)\right]}$$

When the water depth is measured using a submerged pressure sensor, significant errors introduced(See Table 2) if water depth is measured by dividing the pressure measured using a pressure sensor by the specific gravity of water ($h=P/\gamma$).

It is usual that the upper end of the atmospheric pressure compensation tube is located higher than the water surface. Therefore, the atmospheric pressure $P'_a$ transferred to a pressure sensor is smaller than the atmospheric pressure on the water surface $P_a$, that is:

$$P'_a = P_a - \gamma_a h_a = P_a - \gamma_{a0} \frac{T_0}{T} h_a$$

where $h_a$ is the elevation difference between the upper end of atmospheric pressure compensation tube and the water surface. Therefore, The pressure measured using a pressure sensor is given as follows.

$$P = \gamma h + P_a - \left( P_a - \gamma_{a0} \frac{T_0}{T} h_a \right) = \gamma h + \gamma_{a0} \frac{T_0}{T} h_a$$

Therefore, the water depth h should be calculated using a following equation.

$$h = \frac{P - \gamma_{a0} \frac{T_0}{T} h_a}{\gamma}$$

where $h_a$ is a variable according to the water depth(level) variation;

$$h_a = h_0 - h$$

Finally, the water depth measurement equation is given as follows;

$$h_i = \frac{P_i - \gamma_{a0} \frac{T_0}{T} h_0}{\gamma - \gamma_{a0} \frac{T_0}{T}} \quad (31)$$

where $h_0$ is the elevation difference between the upper and bottom ends of the atmospheric pressure compensation tube.

If the denominator of the equation (31), $$\gamma_{a0} \frac{T_0}{T} \simeq 1.3 \times 10^{-6} \text{ kgf/cm}^3$$

is neglected, the supplemental water depth measurement error will be 0.13%, and if the water depth is 10 m, the supplemental error will be 1.3 cm.

As shown in Table 2, if $h_0$ is 60 m at a reservoir, the water depth measurement error will be over 8 cm when not using equation (31).

The accurate equation to measure the specific gravity of water(liquid) using two submerged pressure sensors is given as follows;

$$\gamma = \frac{P_2 - P_1 + \gamma_{a0} \frac{T_0}{T} \Delta h}{\Delta h} \quad (32)$$

Even though $$\gamma_{a0} \frac{T_0}{T} \Delta h$$

is a small value, if specific gravity is measured with the accuracy of better than 0.1%, this term should not be neglected.

The feature of this invention is to measure the water depth by substitution of equation (30) into equation (31).

It is not needed to measure the specific gravity separately, if only the water depth is measured, following equation is used.

$$h_2 = \frac{\left( P_2 - \gamma_{a0} \frac{T_0}{T} h_0 \right) \Delta h}{P_2 - P_1 + \gamma_{a0} \frac{T_0}{T} (1 - \Delta h)} \quad (33)$$

Even though the gas column pressure is compensated with a high precision, the error can be larger according to the inside diameter of the measurement pipe and amount of compressed gas supplied.

The basic reason for which the gas bubble type level meter is not widely used for hydrological observation is as follows.

The level measurement error was large since the initial gas bubble type level meter for reservoir measured the pressure when the gas bubble was coming out from the measurement pipe for water column pressure. Furthermore, the specific gravity of water was not measured, and the gas column pressure was neglected.

Figure 5:
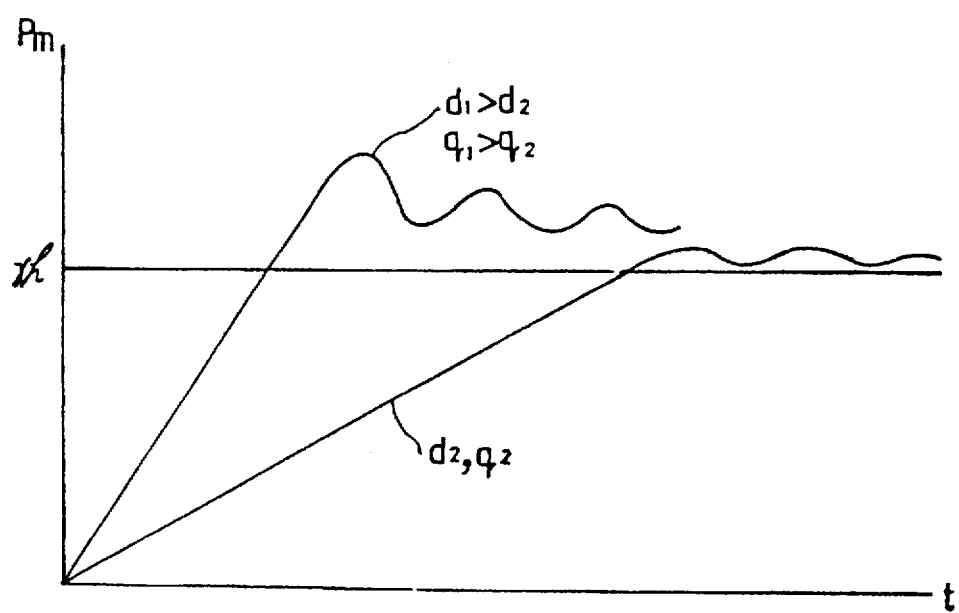
FIG. 5 is a view showing the pressure changing curve of compressed gas for the gas bubble type level meter according to the amount of compressed gas supplied.

FIG. 5 shows the variation of gas pressure measured at the upper part of measurement pipe for water column pressure, $P_m$, depending on the amount of compressed gas supplied, q. As shown in FIG. 5, the required pressure, $P_m$ in order to generate bubbles is larger than the water column pressure, and the pressure is fluctuating as bubbles are coming out when using the measurement pipe for water column pressure of a larger inside diameter. The amplitude of pressure fluctuation and $P_m$ are increased as the inside diameter and amount of compressed gas supplied are increased. If the inside diameter of the measurement pipe for water column pressure and the amount of compressed gas supplied are decreased, $P_m$ and the pressure fluctuation are decreased. The level measurement error could be increased due to these phenomena.

If the inside diameter of the measurement pipe for water column pressure and the amount of compressed gas supplied are decreased, the error can be decreased, however, the measurement time is prolonged.

According to this invention, the method to measure the level and water depth according to eq. (18) or (19) is given as follows.

Figure 6:
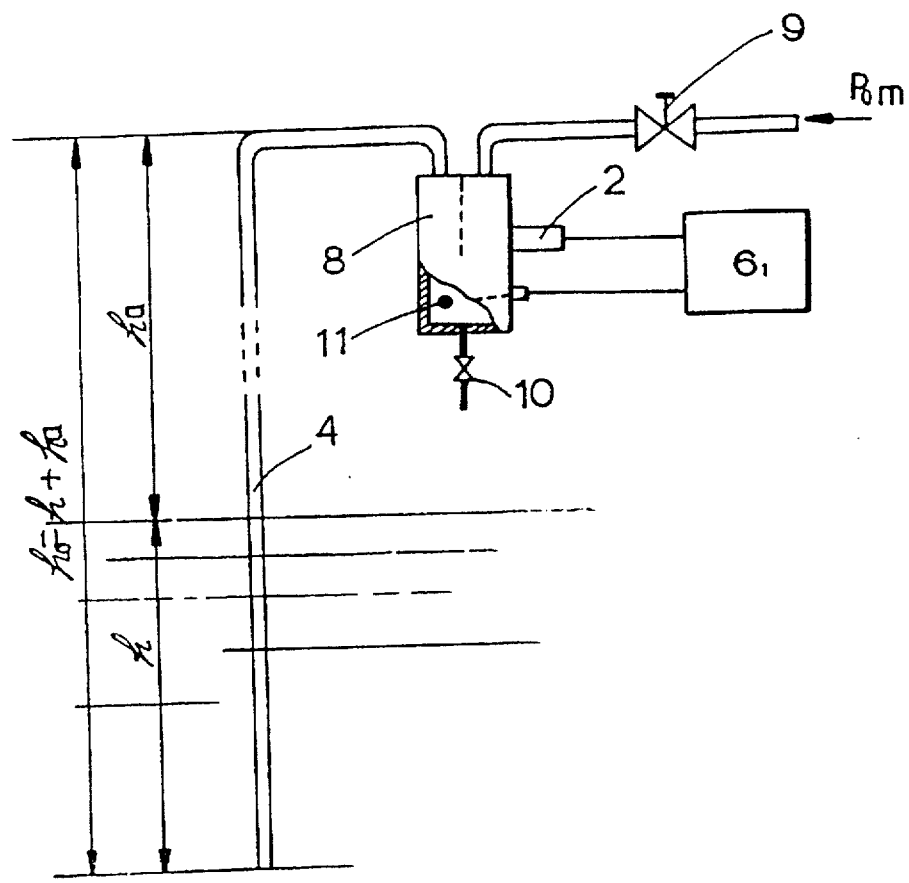
FIG. 6 is a view showing the gas bubble type measurement apparatus for water column pressure according to this invention.

As shown in FIG. 6, compressed gas of $P_{0m}$ is supplied for the time interval of $t_1$ through the pressure sensor (2) and buffer tank (8) by opening the valve (9) slowly, and the valve (9) is then closed. The pressure of gas supplied, $P_m$, is maintained at a little bit higher pressure than the water column pressure, γh, corresponding to the measurement range of the measurement pipe for water column pressure.

In FIG. 6, (6) is a calculating apparatus of level meter for water depth and level, (11) is a temperature sensor, and (10) is a water drain valve.

Figure 7:
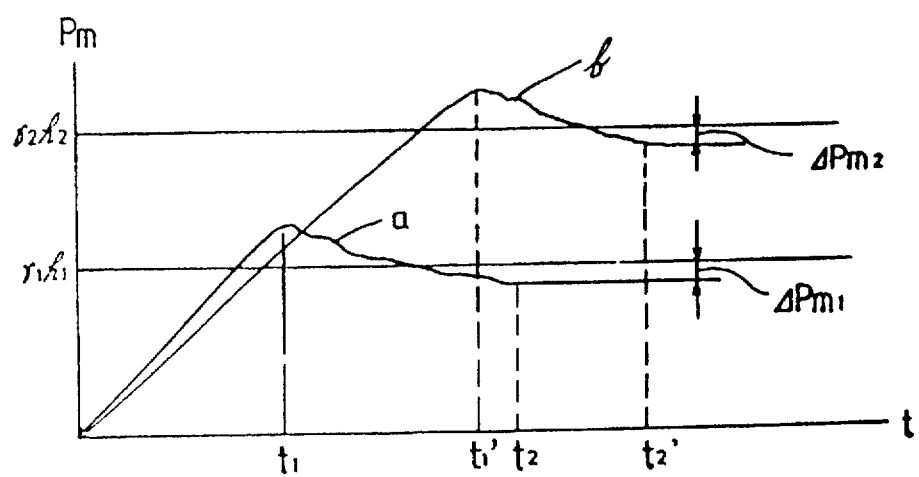
FIG. 7 is a view showing the pressure changing status of compressed gas for the gas bubble type measurement method for water column pressure according to this invention.

If water depth is $h_1$, water column pressure, $\gamma Y_1 h_1$, is little bit lower than $P_{0m}$, the pressure of compressed gas varying as shown in FIG. 7 (a) is measured by the pressure sensor (2).

As shown in FIG. 7, at the moment that the valve (9) is closed, the pressure is decreased while pressure is a little bit fluctuating (bubble is coming out) from $t_1$ and then stabilized from $t_2$. The pressure at that time becomes $\gamma_1 h_1 - \Delta P_{m1} = P_{m1}$. When $\gamma_2 h_2$ is larger than $y_1 h_1$, the pressure variation is shown in FIG. 7 (b). The volume of the buffer tank (8), V, is better to select to be 5 times of the internal volume of the measurement pipe for water column pressure, $v = (\pi d^2 4) \times h_0$. If the volume of the buffer tank is too large, it takes too much time to supply compressed gas. A temperature sensor (11) is installed in the buffer tank, and the buffer tank plays the following roles.

- As shown in FIG. 7, the buffer tank makes that the pressure $P_m$ is gradually decreased, and then the pressure in the measurement pipe for water column pressure is stabilized to $\gamma h - \Delta P_m$. (For using a portable level meter, when the pressure $\Delta P_{0m}$ is applied using a manual air pump, the pressure fluctuation usually occurs, and the buffer tank can reduce the pressure fluctuation in the measurement pipe for water column pressure (4)). If the buffer tank is not installed, reproducibility of the level measurement is getting worse.
- The air temperature in the buffer tank measured by the temperature sensor (11) is similar to the air temperature in the measurement pipe for water column pressure (4) when air in the buffer tank is coming out from the lower end of the measurement pipe for water column pressure as bubbles. Therefore, temperature at a certain point shows little difference from the average air temperature in the measurement pipe for water column pressure.
- When the level is decreased after the measurement of level, level decrease can be continuously measured for a long time using the excessive pressure in the buffer tank.
- When there occurs tides at the river and reservoir, the pressure fluctuation due to tides is significantly decreased.

According to this invention, pressure is not measured when the gas bubbles are steadily coming out, pressure $P_m$ is measured when pressure is stabilized by using the buffer tank after the supply of compressed gas is stopped. Furthermore, the measurement error of level is decreased using eq. (18) or (19) with the measured air temperature in the buffer tank.

According to this invention, level can be measured with a sufficient accuracy using a gas bubble type level meter, and this level meter can be used as portable, automatic recording and remote measurement with advantages of simple installation, operation and maintenance.

Figure 8:
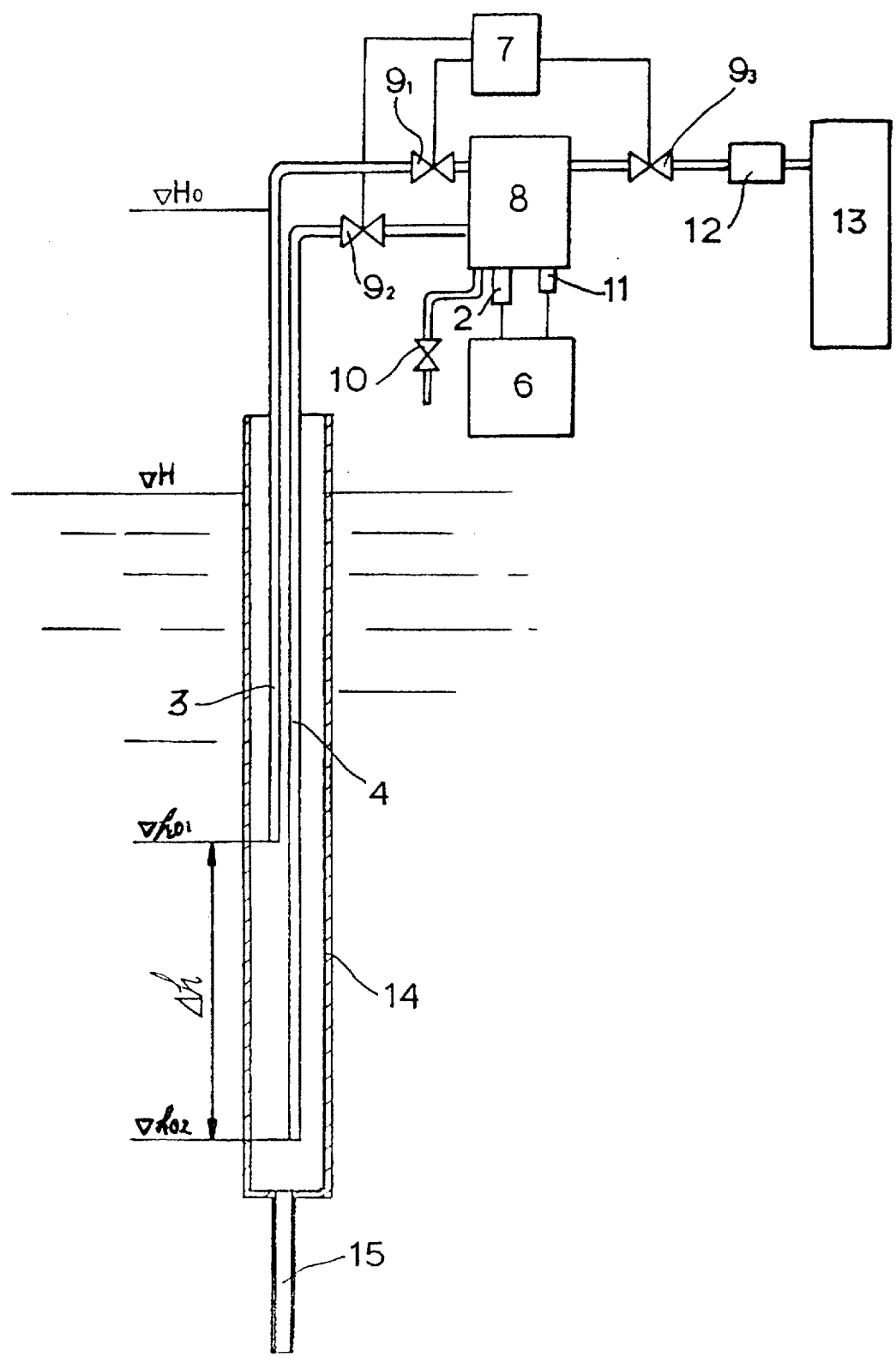
FIG. 8 a view showing the gas bubble type measurement apparatus of level according to this invention.

FIG. 8 shows the gas bubble type level meter including above mentioned characteristics.

(12) of the FIG. 8 is a pressure safety valve which maintains a little bit higher pressure than $\gamma_2 h_2$ at the outlet even though a higher pressure is applied. (13) is a tank for compressed gas or an air compressor. (10) is a condensed water drain valve which drains condensed water in the buffer tank.

At the initial stage, valves ($9_3$) and ($9_1$) are closed and the valve ($9_2$) is opened. When measurements begin, the valve ($9_3$) is opened by the valve controller (7), compressed gas is supplied through the buffer tank (8) and the valve ($9_2$), and then the valve ($9_3$) is closed. Be sure to wait until the pressure is stabilized to $P_{m2} = \gamma_2 h_2 - \Delta P_{m2}$ (to $t_2$ in FIG. 7).

The outputs of the pressure sensor (2) and the temperature of compressed gas measured by the temperature sensor (11) are sent to the level calculating apparatus of level meter (6).

After the measurement of $P_{m2}$, $P_{m2}$ and T are stored at (6), the valve ($9_2$) is closed, and the valve ($9_1$) is opened. Then water in the measurement pipe for water column pressure (3) is removed out while compressed gas (pressure $P_{m2} > \gamma_1 h_1$) in the buffer tank is supplied to the measurement pipe for water column pressure (3), and the pressure of air is stabilized to $P_{m1} = \gamma_1 h_1 - \Delta P_{m1}$ while bubbles are coming out due to excessive pressure. $P_{m1}$ and T are sent to the level calculating apparatus of level meter (6).

The reference elevation of $H_0$, $\Delta h$ and $h_{o2}$ are initially stored at the level calculating apparatus of level meter (6).

The level calculating apparatus of level meter (6) is calculating the water depth, $h_2$, using eq. (25) or (26), and then the level is displayed on the indicator, recorded automatically, or necessary electrical signals are supplied for remote measurements.

When it is used as a portable level meter, the pressure sensor (2), temperature sensor (1) and level calculating apparatus of level meter (6) are portable, and the compressed air is supplied using a portable manual air pump. In this case, the measurement pipes for water column pressure (3) and (4), valves ($9_1$) and ($9_2$), and buffer tank (8) are installed, and the valve controller (7) and pressure safety valve (12) are not installed at the measurement site, for example, level measurement well of the underground water. The valves ($9_1$) and ($9_2$) are manually operated.

The tank of compressed gas is connected to the pressure safety valve (12) for remote measurement or automatic recording, and connected to a small air compressor when the permanent power is available. The valves ($9_1$)–($9_3$) are electromagnet valves, and the valve controller (7) is operated by the signal from timer.

The anti-corrosion plastic pipe of inside diameter of 2–4 mm is used for the measurement pipes for water column pressure.

The level measurement error can be large when measuring the level of reservoir and river, even though the average level is measured through repeated measurements. In this case, the measurement pipes for water column pressure (3) and (4) are installed inside the wave oscillation reduction pipe of a larger diameter (14), and the pipe of a smaller inside diameter is installed at the lower end. The wave oscillation reduction pipe (14) protects the measurement pipe for water column pressure (3) and (4).

Figure 9:
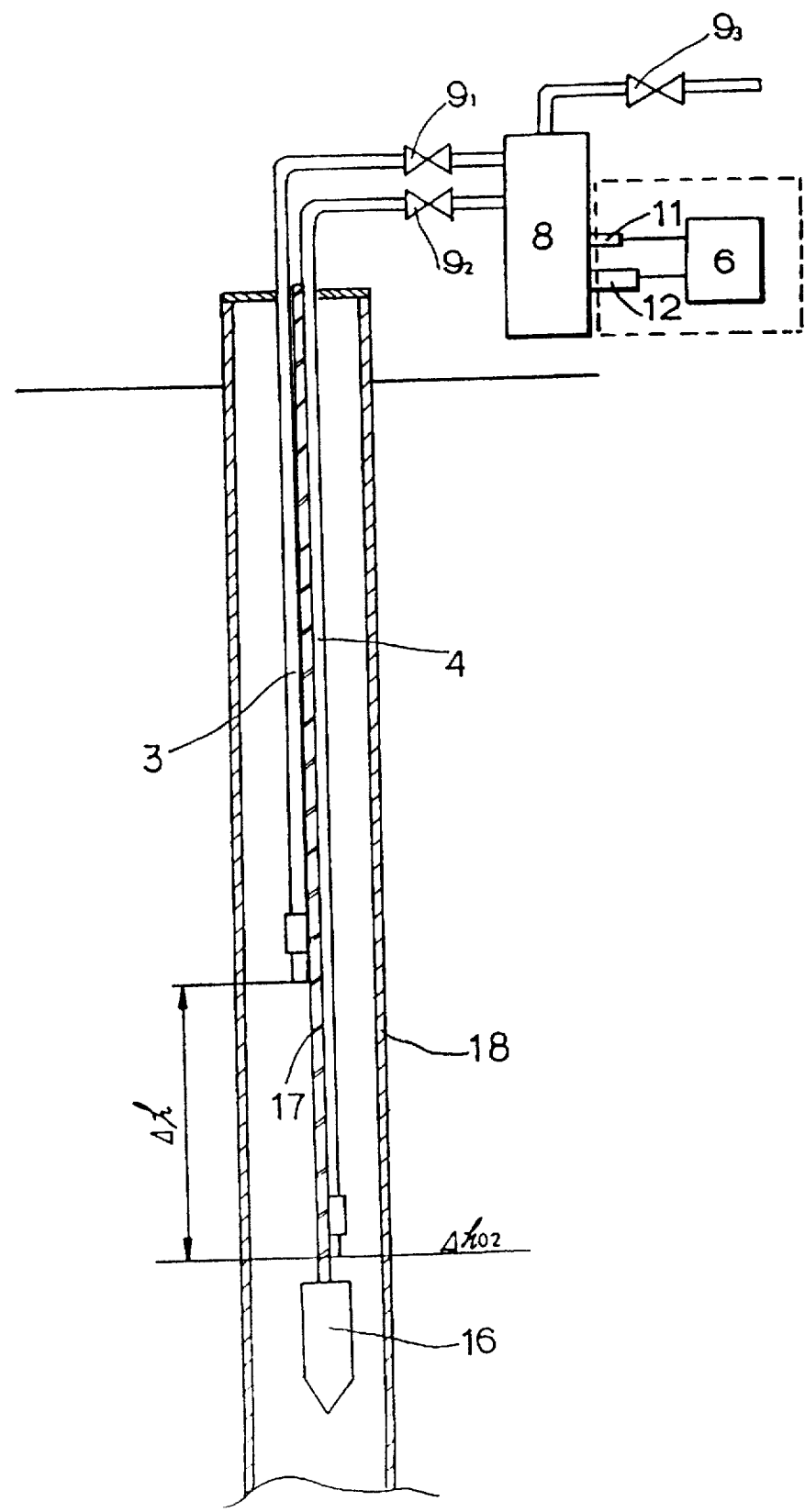
FIG. 9 is a view showing an actual example of the gas bubble type measurement apparatus of underground water level according to this invention.

FIG. 9 shows the installation drawing of measurement pipes for water column pressure at the level measurement well of underground water as an example.

In FIG. 9, (17) is a steel wire or a wire of other material with a less elasticity and a high durability, and (16) is a weight.

The measurement pipes for water column pressure (3) and (4) are bound to the wire (17) with a weight (16). The wire (17) with a weight (16) is inserted to the level measurement well of underground water by a required depth. $h_{o2}$ can be found by measuring the length of the wire (17) inserted to the measurement well (18).

As described above, installation of the measurement pipes for water column pressure is simple, and it takes less cost compared with the pressure sensor type level meter. Since the measurement pipes for water column pressure (3) and (4), valves ($9_1$)–($9_3$) and the buffer tank (8) are installed at the level measurement well, and observers measure the level only, then it is much better technically and economically compared with the pressure sensor type level meter.

Since the specific gravity does not change frequently, there is no problem that the measurement pipe for water column pressure (3) to measure specific gravity is not available, or specific gravity is measured with another method one time per several months.

Figure 10:
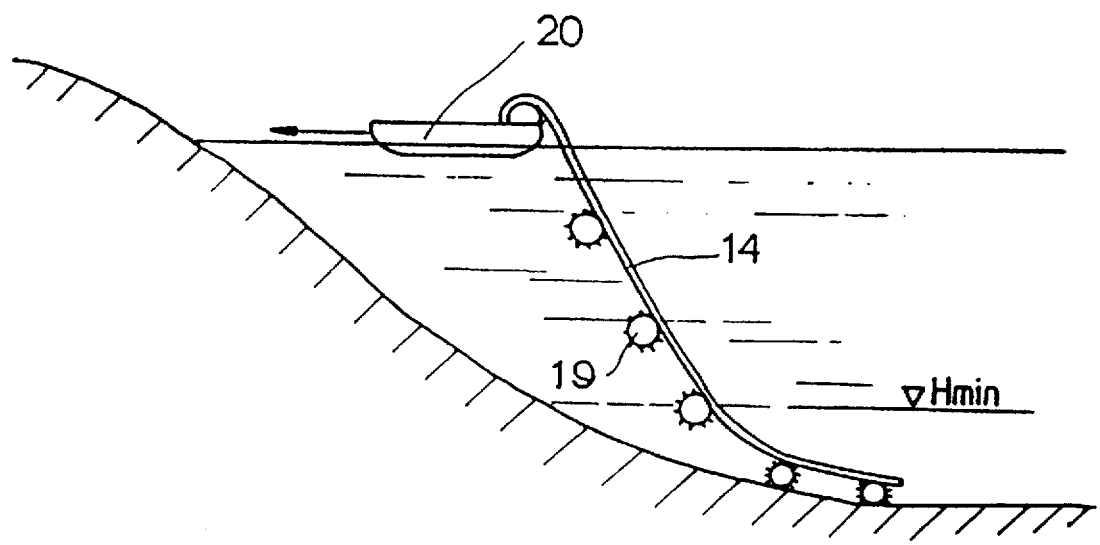
FIG. 10 is a view showing an actual example of installation method for measurement pipes for water column pressure to measure the level of reservoir or level of tide using gas bubble type level meter.

FIG. 10 is an installation example of measurement pipes for water column pressure to measure the level of reservoir or level of tide.

The measurement pipes for water column pressure is installed inside the wave oscillation pipe (also protection pipe) (14), and the measurement pipes for water column pressure in the protection pipe are not shown in FIG. 10.

In FIG. 10, (19) is an anchor shaped weight, and since anchor shaped weights are installed in the protection pipe (14), the protection pipe (14) at which the measurement pipes for water column pressure are installed can not move.

The measurement method of location of the lower end of the measurement pipes is not described here since it is not applied for patent.

The consumption of compressed gas (or air) is a very small amount for each measurement. The amount of consumption of compressed gas is not over 1.5 l at the reference condition, when the length of the measurement pipe for water column pressure is 100 m and the inside diameter of the pipe is 0.4 cm. Furthermore, the level is lowered down, additional compressed gas is not consumed since the pressure in the buffer tank (8) is higher.

When a small air compressor is not used, and a compressed gas tank of 25 l (for example, nitrogen or air) at 50 atmospheric pressure is used, the level can be measured at about 800 times. It can be used for about 400 days when the level of river or reservoir is measured two times a day, and it is not difficult to change the compressed gas tank one time a year.

What is claimed is:

1. For the water depth, h, and level measurement method through the measurements of water column pressure at two locations, two submerged pressure sensors are installed, one is installed at the depth of $h_1$, the other is installed at the depth of $h_2=h_1+\Delta h$, and for case that the water column pressure is measured by a gas bubble type level meter, a lower end of one measurement pipe for water column pressure is installed at the depth of $h_1$, the lower end of another measurement pipe for water column pressure is installed at the depth of $h_2=h_1+\Delta h$, the above method is comprising of the following steps of;

the output of the pressure sensor installed at the depth of $h_2$ is measured as water column pressure, $P_2$, the output of the pressure sensor installed at the depth of $h_1$ is measured as water column pressure, $P_1$, and for case that the water column pressure is measured by the gas bubble type level meter, a gas pressure $P_{m2}$ which removes water inside the measurement pipe for water column pressure installed at the depth of $h_2$, the gas pressure $P_{m1}$ which removes the water inside the measurement pipe for water column pressure installed at the depth of $h_1$;

under above condition, an average specific gravity of water (liquid) at the range water depth of $h_2$ is measured by pressure sensors using the following equation, $$\gamma = \frac{P_2 - P_1 + \gamma_{a0}\frac{T_0}{T}\Delta h}{\Delta h} \quad ; \tag{a}$$

when water column pressure is measured by the gas bubble type level meter, the water depth and level are measured by substituting specific gravity which is measured by the following equations the h measurement equation;

(when a level measurement observatory is located higher than water surface)

$$\gamma = \frac{(P_{m2} - P_{m1})\left(1 + \alpha\gamma_{a0}\frac{T_0}{T}\frac{h_{02}}{P_0}\right)}{\Delta h\left[1 - \alpha\gamma_{a0}\frac{T_0}{T}\left(1 + \frac{P_{m1}}{P_0}\right) \times 10^3\right]} \quad (\text{kgf/cm}^3) \tag{b}$$

(when a level measurement observatory is located lower than water surface)

$$\gamma = \frac{(P_{m2} - P_{m1})\left[1 + \alpha\gamma_{a0}\frac{T_0}{T}\left(h_{02}\frac{+10^3}{\alpha}\right)\right]}{\Delta h\left[1 - \alpha\gamma_{a0}\frac{T_0}{T}\left(1 + \frac{P_{m1}}{P_0}\right) \times 10^3\right]} \quad (\text{kgf/cm}^3) \tag{c}$$

In the above equations, $h_{02}$ is an elevation difference between the lower end of measurement pipe for water column pressure and location for pressure measurement. $\alpha$ is $\gamma_{g0}/\gamma_{a0}$, a ratio of specific gravities of gas to air used to measure the water column pressure. $10^3$ is $P_0/\gamma$ and $\gamma'_{a0}$ is $\gamma_{a0}/P_0$ (1/cm), and $|\gamma'_{a0} \simeq |\gamma_{a0}|$.). When the water depth of liquid other than water, whose specific gravity is the value of $P_0/\gamma$ should be used instead of $10^3$.

2. For measuring the water column pressure by the gas bubble type level meter, the method to measure the water depth, $h_i$ ($h_2$ or $h_1$), by the following equation through the measurement of gas pressure, $P_{mi}$, when the gas pressure is stabilized for which the gas of higher pressure P than the water column pressure is supplied to the measurement pipe, for water column pressure, then a gas supply is stopped at which the gas pressure reaches P and fluctuates, according to claim 1;

when a level measurement observatory is located higher than water surface $$h_i = \frac{P_{mi} + \gamma_{a0}\frac{T_0}{T}h_{0i}\left[\alpha\left(1 + \frac{P_{mi}}{P_0}\right) - 1\right]}{\gamma - \gamma_{a0}\frac{T_0}{T}} \quad (\text{cm}) \tag{d}$$

or $$h_i = \frac{P_{mi} + P'_{mi}\gamma_{a0}\frac{T_0}{T}(h_{0i} + 10^3) + \frac{(\alpha - 1)\gamma_{a0}\frac{T_0}{T}h_{0i}}{\gamma}}{\gamma} \quad (\text{cm}) \tag{e}$$

when a level measurement observatory is located lower than water surface $$h_i = \frac{P_{mi} - \gamma_{a0}\frac{T_0}{T}h_{0i}\left[\alpha\left(1 + \frac{P_{mi}}{P_0}\right) - 1\right]}{\gamma - \gamma_{a0}\frac{T_0}{T}} \quad (\text{cm}) \tag{f}$$

or $$h_i = \frac{P_{mi} - \gamma_{a0}\frac{T_0}{T}[\alpha(1 + P'_{mi})h_{0i} + h_a - P'_{mi} \times 10^3]}{\gamma} \quad (\text{cm}) \tag{g}$$

For the case that the water depth is measured with a submerged pressure sensor, the water depth is measured using the following equation by compensating the atmospheric pressure using compensation tube connected with the pressure sensor;

$$h_i = \frac{P_i - \gamma_{a0}\frac{T_0}{T}h_{0i}}{\gamma - \gamma_{a0}\frac{T_0}{T}} \tag{h}$$

($h_{0i}$—elevation difference between the top and bottom of the atmospheric pressure compensation tube) where $\gamma_{a0}$ (kgf/cm$_3$) is the specific gravity of air at the reference state $P_0=1.03$ kgf/cm$^2$, $T_0=293$K, T is the absolute temperature of air in the measurement pipe for water column pressure, $h_{0i}$ is the elevation difference between the lower end of the measurement pipe for water column pressure and the location for pressure measurement. $h_a$ (cm) is the elevation difference between the water surface and the location for pressure measurement. $P'_{mi}$ is $P_{mi}/P_0$, and $10^3$ is 1 (kgf/cm²) /γ (cm), that is, a reciprocal of specific gravity of water. When the water depth of liquid other than water whose specific gravity is $\gamma_e$ is measured, the value of $P_0/\gamma_e$ is used instead of $10^3$.

3. According to the claim 1, in which:

the water depth measurement method using gas bubble type by the following simple equation for case that the water depth is measured, the specific gravity of liquid is measured, and the measured specific gravity is not needed to substitute into the water depth measurement equation.

$$h_1 = \frac{\Delta h}{\frac{P_{m2}}{P_{m1}}\left(1 \pm \gamma_{a0}\frac{T_0}{T}\Delta h\right) - 1} \qquad (i)$$

or $$h_2 = \frac{\Delta h}{1 - \frac{P_{m1}}{P_{m2}}\left(1 \mp \gamma_{a0}\frac{T_0}{T}\Delta h\right)} \qquad (j)$$

A (−) sign in parenthesis in the equation (i) and a (+) sign in the parenthesis in the equation (j) indicate the case that the level measurement observatory is located under the water surface.

4. A level measurement apparatus according to the gas bubble type water depth and level meter, in which:

the measurement pipe for water column pressure is composed of plastic pipes of inside diameter of 2–4 mm;

two measurement pipes for water column pressure are bounded that, the elevation difference between the ends of two measurement pipes is Δh;

the upper ends of two measurement pipes for water column pressure are connected to a buffer tank using valves;

the pressure sensor to measure the gas pressure in the buffer tank and a temperature sensor to measure the gas temperature in the buffer tank are installed;

the supplying pipe of compressed gas with a valve is connected to the buffer tank;

the outputs of pressure sensor and temperature sensor are sent to the apparatus to calculate the specific gravity, water depth and level according to claim 2;

the level calculating apparatus contains an apparatus to convert displayed and calculated values of level to electrical or coded signals, and an apparatus to store the elevations of the upper and lower ends of the measurement pipes for water column pressure, elevation difference between the lower ends of the measurements pipes for water column pressure, elevation of reference point for level measurement, pressures and temperatures of compressed gas used at the reference state and the specific gravity of gas at the reference state;

for case of automatic measurement, the valve controller is connected with valves which the valve connected to a long measurement pipe for water column pressure is opened, the valve to supply the compressed gas is opened, the valve connected to a long measurement pipe for water column pressure is closed and the valve connected to a short measurement pipe for water column pressure is opened.

* * * * *